United States Patent
Seo et al.

(10) Patent No.: US 10,133,828 B2
(45) Date of Patent: Nov. 20, 2018

(54) METHOD AND APPARATUS FOR CALCULATING INSERTING FORCE AND REMOVING FORCE BASED ON 3D MODELING

(71) Applicant: Korea Institute of Science & Technology Information, Daejeon (KR)

(72) Inventors: Dong Woo Seo, Daejeon (KR); Myung Il Kim, Daejeon (KR); Jae Sung Kim, Daejeon (KR)

(73) Assignee: KOREA INSTITUTE OF SCIENCE & TECHNOLOGY INFORMATION, Daejeon (KR)

( * ) Notice: Subject to any disclaimer, the term of this patent is extended or adjusted under 35 U.S.C. 154(b) by 0 days.

(21) Appl. No.: 15/818,573

(22) Filed: Nov. 20, 2017

(65) Prior Publication Data
US 2018/0144069 A1   May 24, 2018

(30) Foreign Application Priority Data
Nov. 21, 2016   (KR) .......................... 10-2016-0154964

(51) Int. Cl.
*B25J 9/16*   (2006.01)
*G06F 17/50*  (2006.01)
(Continued)

(52) U.S. Cl.
CPC ............. *G06F 17/50* (2013.01); *A63H 33/08* (2013.01); *B25J 9/1666* (2013.01); *B65D 43/16* (2013.01);
(Continued)

(58) Field of Classification Search
CPC .. B25J 9/1658; B25J 9/108; B25J 3/04; G06F 3/016; B33Y 50/02; G06T 17/10; G06Q 10/101; B24B 27/1038
See application file for complete search history.

(56) References Cited

U.S. PATENT DOCUMENTS

| | | | |
|---|---|---|---|
| 6,792,398 B1 * | 9/2004 | Handley | ................. G06F 3/016 345/419 |
| 2006/0041448 A1 * | 2/2006 | Patterson | ............. G06Q 10/101 705/301 |

(Continued)

FOREIGN PATENT DOCUMENTS

| | | |
|---|---|---|
| JP | 2001-249958 A | 9/2001 |
| JP | 2005-346497 A | 12/2005 |

(Continued)

*Primary Examiner* — Kandasamy Thangavelu
(74) *Attorney, Agent, or Firm* — SoCal IP Law Group LLP; Mark Andrew Goldstein; Angelo Gaz

(57) ABSTRACT

A method of calculating an inserting force using 3D modeling, the method being performed by a numerical analysis apparatus is provided. The method includes receiving 3D modeling of a first model and a second model and receiving a first movement direction of the first model to couple the first model to the second model and searching for a contact surface between the first model and the second model while simulating the movement of the first model along the first movement direction and calculating an inserting force required in the process of coupling the first model and the second model by using the contact surface.

6 Claims, 14 Drawing Sheets

(51) Int. Cl.
*A63H 33/08* (2006.01)
*B65D 43/16* (2006.01)

(52) U.S. Cl.
CPC ...... *G06F 17/5009* (2013.01); *G06F 2217/12* (2013.01); *G06F 2217/16* (2013.01)

(56) References Cited

U.S. PATENT DOCUMENTS

| | | | | |
|---|---|---|---|---|
| 2007/0168081 | A1* | 7/2007 | Shin | B25J 9/08 700/245 |
| 2008/0109103 | A1* | 5/2008 | Gershenfeld | B33Y 50/02 700/119 |
| 2010/0241403 | A1* | 9/2010 | Jakobsen | G06T 17/10 703/1 |
| 2012/0220194 | A1* | 8/2012 | Maloney | B24B 27/0038 451/5 |
| 2016/0332305 | A1* | 11/2016 | Gonzalez | B25J 3/04 |
| 2017/0190052 | A1* | 7/2017 | Jaekel | B25J 9/1658 |

FOREIGN PATENT DOCUMENTS

| | | |
|---|---|---|
| JP | 009-059028 A | 3/2009 |
| JP | 2014-100773 A | 6/2014 |
| JP | 2015-056027 A | 3/2015 |
| KR | 1020160052952 | 5/2016 |

\* cited by examiner

1. Surface
2. U Isocurve
3. V Isocurve
4. UV Coordinate
5. Perpendicular Plane
6. Normal Vector

| TIME | MOVEMENT SPEED OF FIRST OBJECT | DISTANCE BETWEEN FIRST OBJECT AND SECOND OBJECT | CONTACT AREA |
|---|---|---|---|
| t1 | 200ms | 0.2 | 0 |
| t2 | 200ms | 0.0 | 5mm |
| t3 | 200ms | 0.0 | 20mm |
| t4 | 200ms | 0.0 | 20mm |

METHOD AND APPARATUS FOR CALCULATING INSERTING FORCE AND REMOVING FORCE BASED ON 3D MODELING

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

RELATED APPLICATION INFORMATION

This patent claims priority from Korean Patent Application No. 10-2016-0154964, filed Nov. 21, 2016, which is incorporated herein by reference in its entirety.

BACKGROUND

Field

The present inventive concept relates to a method and apparatus for calculating an inserting force and a removing force based on 3D modeling, and more particularly, to a method of simulating the process of coupling two objects using 3D modeling and calculating an inserting force and a removing force according to the relative positions of the two objects in the simulation process, and an apparatus performing the method.

Description of the Related Art

There are many products that provide various functions through structural coupling of two objects. One example is a clip and a tube. The clip and the tube can be coupled or separated in the structure of a male/female pair to fix or connect an object.

The force required to couple a pair of male and female objects is called an inserting force, and the force required to separate the two objects coupled to each other is called a removing force. In general, it is desirable for each of the inserting force and the removing force to be within a certain range.

That is, it is not desirable if too much force is required to couple two objects or two objects are separated too easily. This may cause inconvenience to a user. Therefore, a product should be designed to satisfy the target range of the inserting force and the target range of the removing force.

The main factors that affect the inserting and removing forces of a pair of male and female objects are the r ate rials and structures of the two objects. The inserting force and the removing force may vary according to the structure of the entrance portion of the clip to which the tube is coupled and the material of the clip.

However, the problem is that there is a way to measure the inserting force and the removing force of two objects after producing a prototype, but there is no way to take the inserting force and the removing force into consideration at the design stage. If the inserting and removing forces of the two objects can be calculated at the design stage and reflected in design, a product of a desired quality will be produced more efficiently.

SUMMARY

Aspects of the inventive concept provide a method and apparatus for calculating an inserting force and a removing force based on 3D modeling.

Aspects of the inventive concept also provide a method and apparatus for modifying 3D modeling by using as feedback an inserting force and a removing force calculated using the 3D modeling.

However, aspects of the inventive concept are not restricted to the one set forth herein. The above and other aspects of the inventive concept will become more apparent to one of ordinary skill in the art to which the inventive concept pertains by referencing the detailed description of the inventive concept given below.

According to an aspect of the inventive concept, there is provided a method of calculating an inserting force using 3D modeling. The method comprises receiving 3D modeling of a first model and a second model, receiving a first movement direction of the first model to couple the first model to the second model, searching for a contact surface between the first model and the second model while simulating the movement of the first model along the first movement direction, calculating an inserting force required in the process of coupling the first model and the second model by using the contact surface.

DESCRIPTION OF THE DRAWINGS

These and/or other aspects will become apparent and more readily appreciated from the following description of the embodiments, taken in conjunction with the accompanying drawings in which.

DETAILED DESCRIPTION

Hereinafter, preferred embodiments of the present invention will be described with reference to the attached drawings. Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like numbers refer to like elements throughout.

Unless otherwise defined, all terms including technical and scientific terms used herein have the same meaning as commonly understood by one of ordinary skill in the art to which this invention belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms are intended to include the plural forms as well, unless the context clearly indicates otherwise.

The terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Hereinafter, the present disclosure will be described in more detail with reference to the accompanying drawings.

Figure 1A:
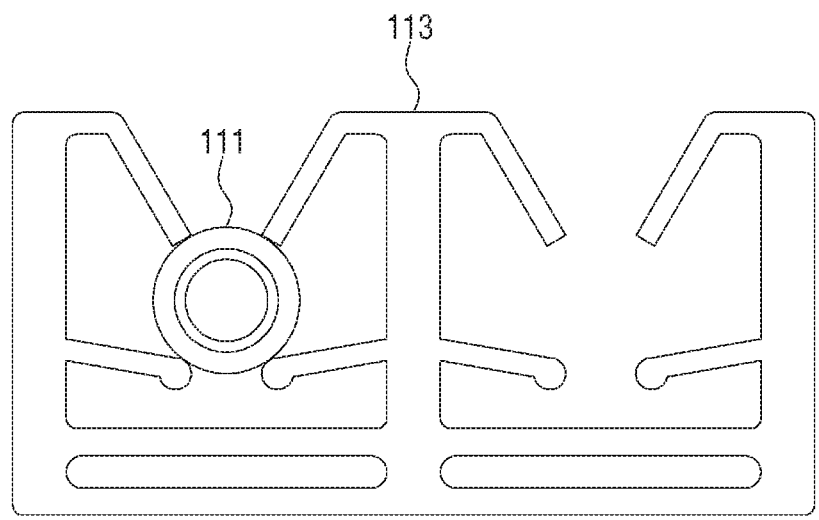
FIGS. 1A through 1C illustrate clips and a tube which coupled in the structure of a male/female pair.
Figure 1B:
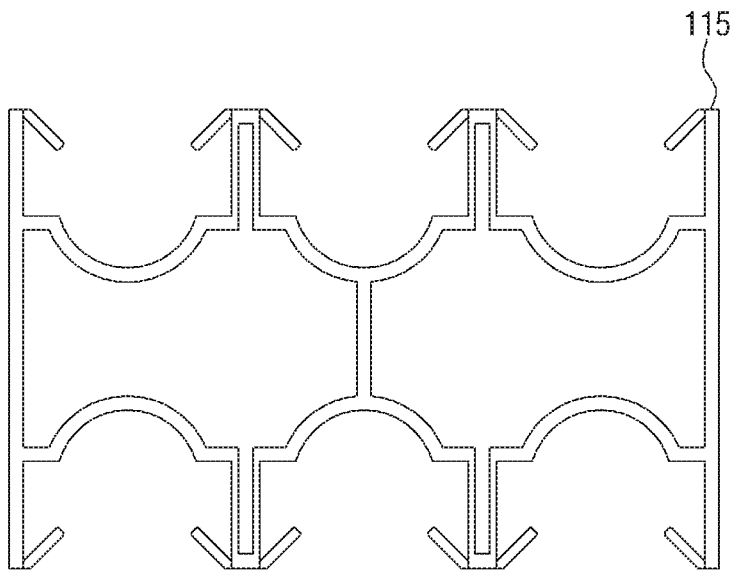
Figure 1C:
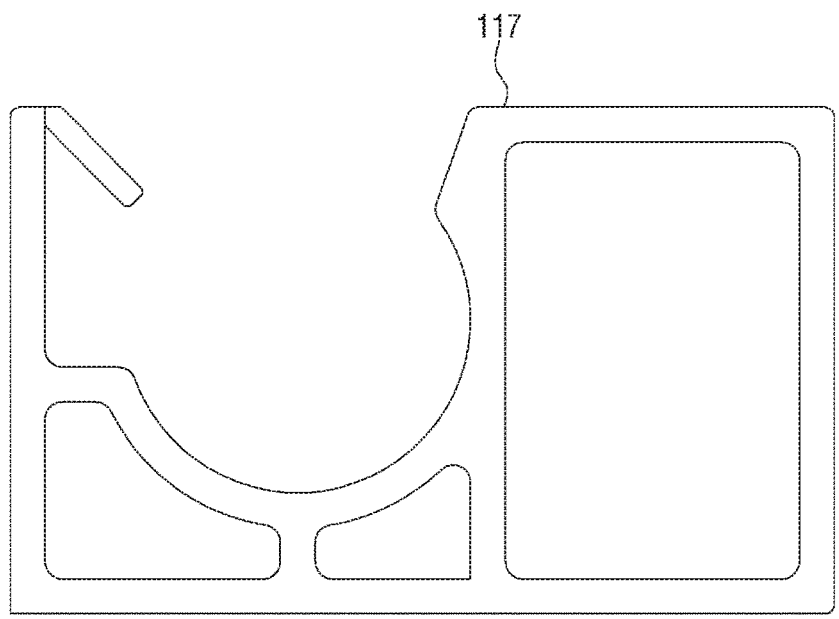

FIGS. 1A through 1C illustrate clips and a tube which are coupled in the structure of a male/female pair.

In FIGS. 1A through 1C, various types of clips 113, 115 and 117 and a tube 111 are illustrated. Referring to FIG. 1A, when the tube 111 is clicked into the entrance of clip 1 113, it is fixed to clip 1 113. When the tube 111 is pulled by applying a force, it can be removed from clip 1 113.

The tube 111 is generally cylindrical, but clips may have various shapes other e shape of clip 1 113 in FIG. 1A. Therefore, the force required to couple or separate the tube 111 to or from a clip may vary according to the shape of the clip. That is, an inserting force and a removing force may vary according to the shape of the clip. The inserting force and the removing force may also vary according to the shape of the tube 111. For example, the inserting force and the removing force may vary according to the inner diameter (i.e., diameter) and the outer diameter of the tube 111.

In addition to clip 1 113 of FIG. 1A, clip 2 115 and clip 3 117 of various shapes are illustrated in FIGS. 1B and 1C. When a pair of male and female objects are structurally coupled to each other, there are usually a portion providing a main frictional force in the process of coupling the two objects and a portion providing a main frictional force in the process of separating the two objects. The angles or shapes of these portions may determine the inserting force and the removing force. Therefore, when designing a product, it is very important to design the product such that the actual inserting force and removing force of the product are included in a target range of the inserting force and a target range of the removing force.

Figure 2A:
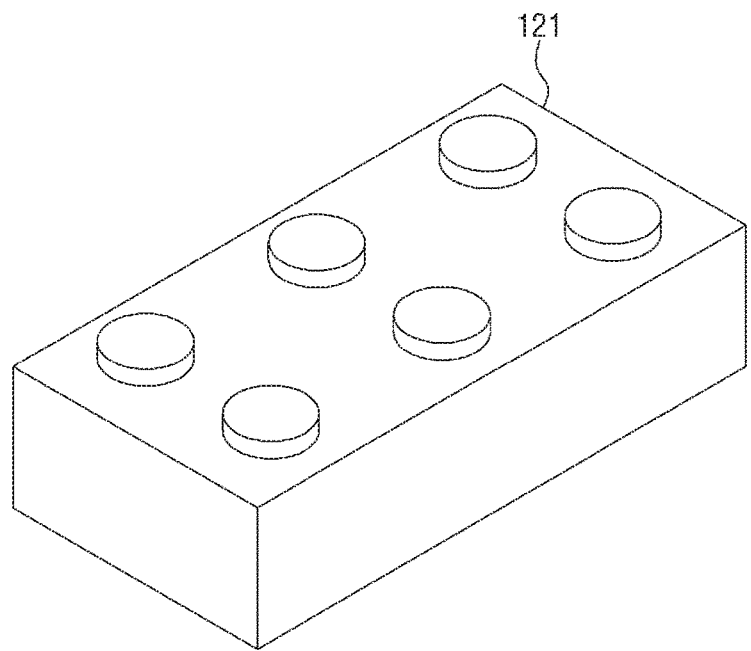
FIGS. 2A through 2C illustrate other types of objects which are coupled in the structure of a male/female pair.
Figure 2B:
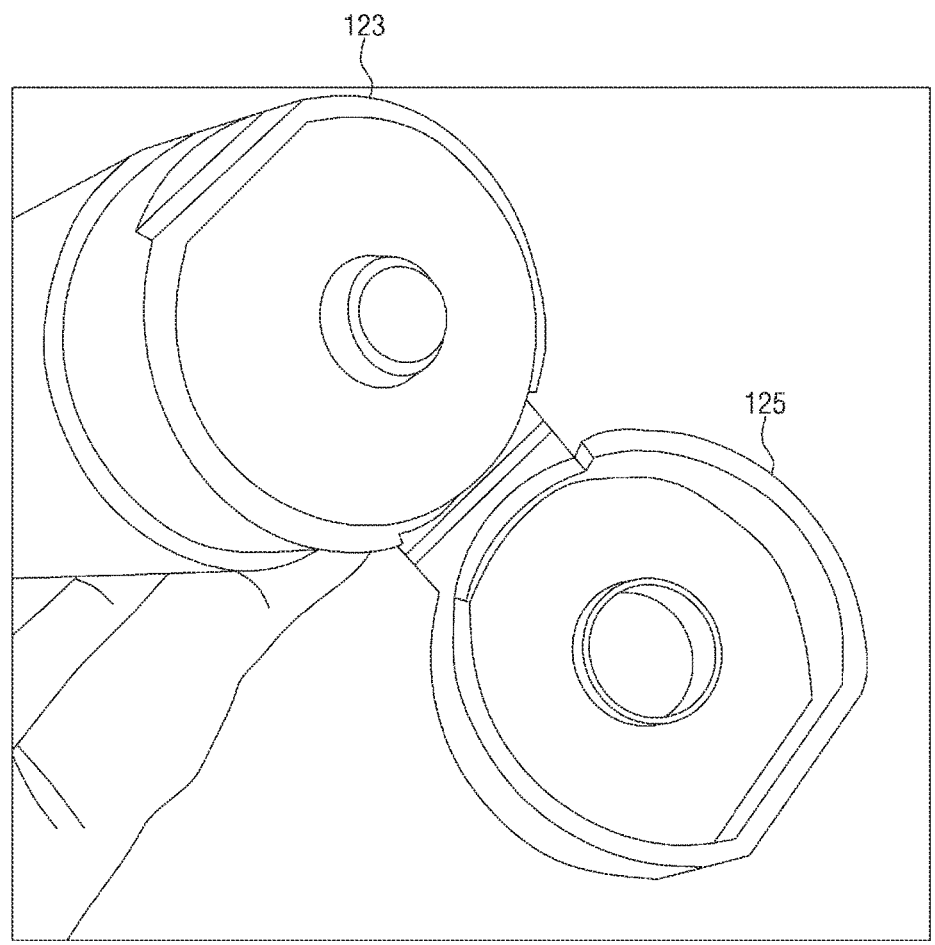
Figure 2C:
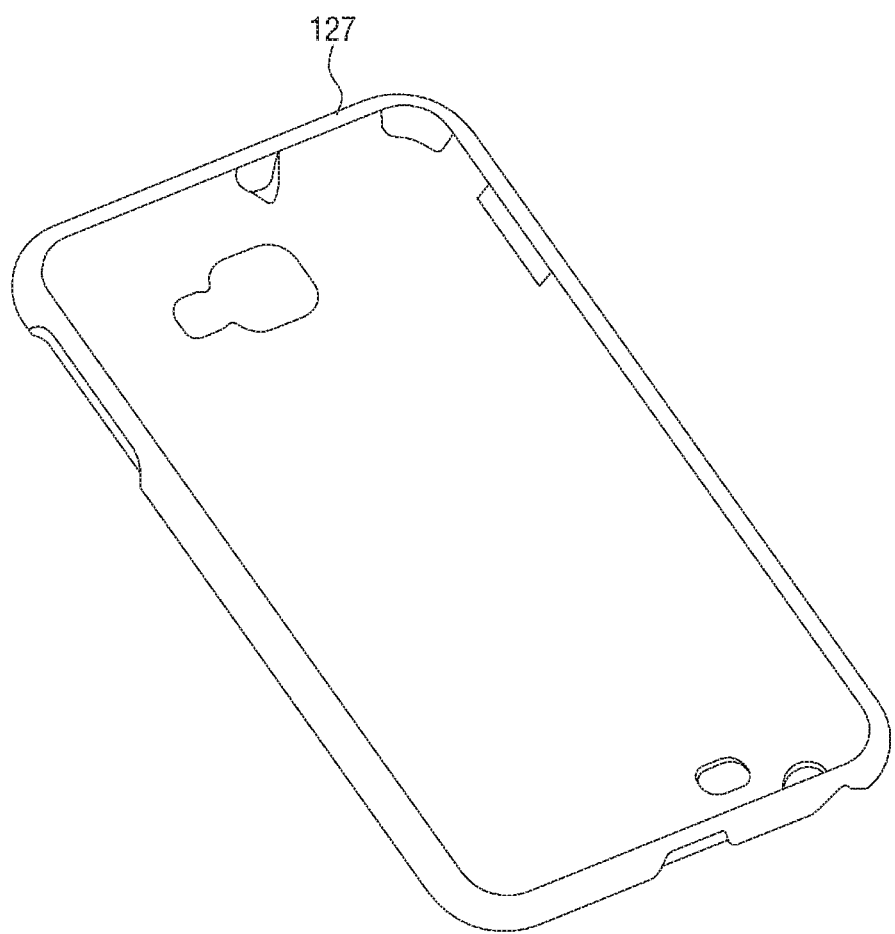

FIGS. 2A through 2C illustrate other types of objects which are coupled in the structure of a male/female pair.

In addition to the tube 111 and the clips 113, 115 and 117 illustrated in FIGS. 1A through 1C, there are many products that provide various functions through structural coupling of a pair of male and female objects. In FIG. 2A, a common LEGO brick 121 is illustrated. A top portion of the LEGO brick 121 serves as a male, and a bottom portion of the LEGO brick 121 serves as a female. LEGO bricks 121 are popular toys among children because they can be combined in various ways.

The main user base of the LEGO bricks 121 is children. However, if it requires as much force as an adult man to combine two LEGO bricks 121, the children will soon get tired of the LEGO bricks 121. Therefore, it is necessary to design the LEGO bricks 121 to be combined with not too much force.

In addition, if LEGO bricks 121 assembled together are easily separated with only a light touch, it is undesirable. However, it is also undesirable if too much force is required to disassemble the LEGO bricks 121. Therefore, a removing force that prevents the LEGO bricks 121 from being separated too easily and allows a young child to easily separate the LEGO bricks 121 is required.

In FIG. 2B, toothpaste 123 and a toothpaste lid 125 are illustrated. When using the toothpaste 123, it is common to hold a toothbrush with one hand while holding the body of the toothpaste 123 with the other hand and then open the lid 125 with a finger. Therefore, the coupling structure of the toothpaste 123 and the toothpaste lid 125 must be designed such that the lid 125 can be fully opened with one finger.

In FIG. 2C, a smartphone case 127 is illustrated. The smartphone case 127 is coupled to a smartphone and mainly used to protect the smartphone. The smartphone case 127 is coupled to the smartphone also through a physical structure. If the removing force is small, the smartphone case 127 may be too easily separated from the smartphone. Thus, the smartphone case 127 cannot fulfill its purpose of protecting the smartphone. Therefore, an appropriate inserting force and removing force are also very important here.

As illustrated in FIGS. 1A through 2C, there are many products that provide various functions through structural coupling of two objects. However, the problem is that there is no way to identify the inserting and removing forces of a pair of female and male objects at the design stage. There is actually a method of producing a prototype and measuring the inserting force and the removing force while testing the produced prototype. However, this method is not efficient.

As disclosed in patent literature JP 2015-056027 A entitled "Method of Calculating Contact Surface Pressure between Two Objects and Computer Program for Calculating Contact Surface Pressure between Two Objects," there is a way to calculate the inserting force and the removing force at the design stage.

However, in patent literature JP 2015-056027, a reference plane is needed to calculate the inserting force and the removing force. That is, the inserting force and the removing force are calculated by defining a contact surface in advance and calculating the pressure at the contact surface. Therefore, there are limitations on calculating the inserting force and the removing force for various models.

That is, in the conventional method, the contact surface pressure is calculated by designating an area where a contact occurs in a situation where models of two objects are already assembled. Therefore, it is difficult to accurately find the contact surface which changes dynamically in the process of coupling or separating the two objects.

In order to solve this problem, it should be possible to calculate the inserting force and the removing force at the design stage and automatically find the contact surface. In other words, it should be possible to automatically find the contact surface in the process of coupling a pair of male and female objects and automatically calculate the inserting force and the removing force according to the contact surface.

Figure 3:
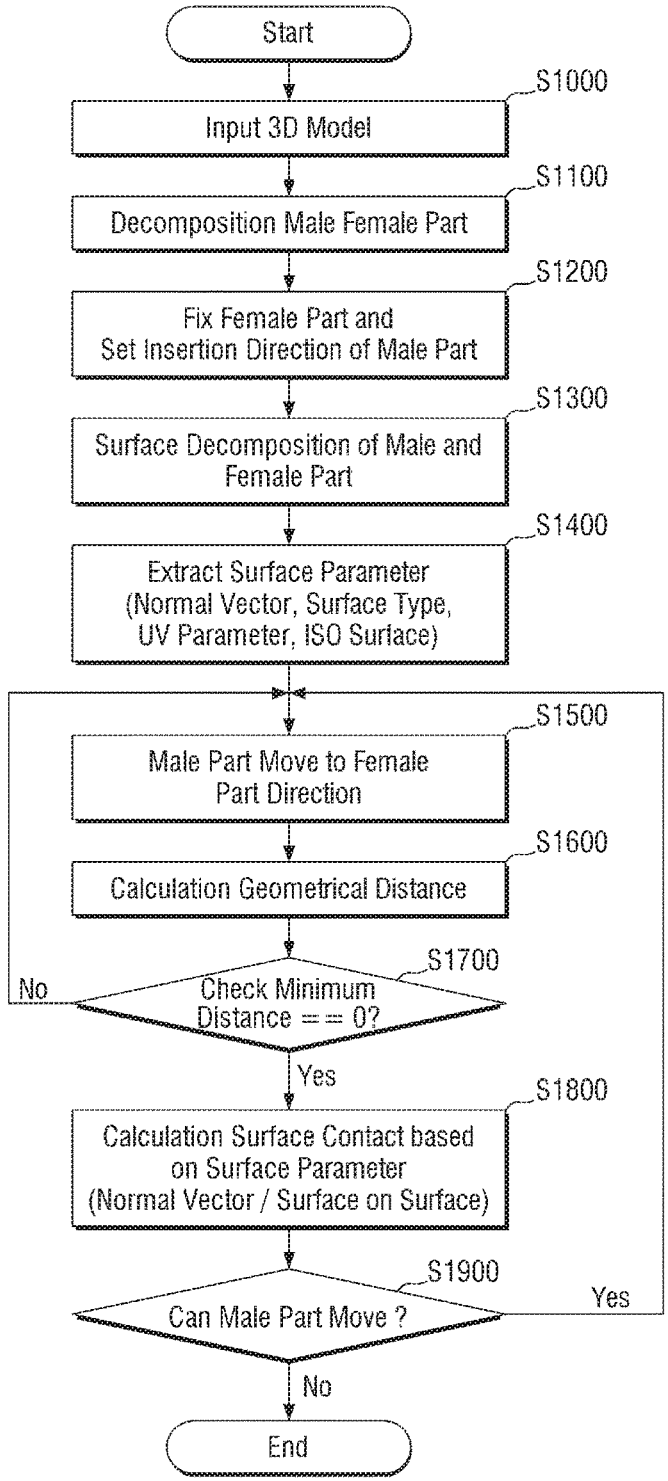
FIG. 3 is a flowchart illustrating a method of calculating an inserting force and a removing force based on 3D modeling according to an embodiment.

FIG. 3 is a flowchart illustrating a method of calculating an inserting force and a removing force based on 3D modeling according to an embodiment.

Referring to FIG. 3, 3D modeling data is input (operation S1000). The 3D modeling data refers to 3D modeling data of an object created using a computer program such as computer aided design (CAD). More specifically, in the inputting of the 3D modeling data, a program for calculating an inserting force and a removing force may load a file created using CAD.

Since 3D modeling is performed using CAD mostly at the design stage of a product, the inserting force and the removing force are calculated using the 3D modeling. In this case, there is no need to convert a CAD file into a file for numerical analysis and to create a prototype. This ensures user convenience.

After the 3D modeling data for calculating the inserting force and the removing force is input (operation S1000), male and female models are identified (operation S1100). That is, it is identified which part of the loaded 3D modeling data corresponds to the female model and which part of the loaded 3D modeling data corresponds to the male model (operation S1100).

This can be done by receiving a user's input for selecting the male and female models. Alternatively, the 3D modeling data of two objects may be analyzed to automatically determine an object having a protruding portion for coupling as the male model and automatically determine the other model as the female model.

After the male model and the female model are identified (operation S1100), the position of the female model is fixed, and the direction in which the male model should move to be coupled to the female model is set (operation S1200). In other words, the starting positions and coupling direction of the two objects are set in order to simulate the process of bringing the two models into contact with each other and then structurally coupling the two models by moving the male model toward the female model.

In the example of FIG. 3, a case where male and female models are identified in loaded 3D modeling data and then coupled to each other by fixing the position of the female model and moving the male model toward the female model is described for ease of understanding. However, since the male and female models are coupled to each other based on the relative positions of the two objects, the female model can also be moved while the male model is fixed.

Therefore, the identifying of the male and female models (operation S1100) or the fixing of the position of the female model and the setting of the movement direction of the male model (operation S1200) can be omitted. That is, it is not necessary to load 3D modeling data and identify a male model and a female model in the 3D modeling data. In addition, it is not necessary to fix a specific object and set the movement direction of another object. However, it is necessary to set the relative movement directions and speeds of the two objects.

For example, the inserting force and the removing force in a case where object A is stationary and object B moves to the left at a speed of 10 cm/s to be coupled to object A have the same values as the inserting force and the removing force in a case where object A moves to the right at a speed of 5 cm/s and object B moves to the left at a speed of 5 cm/s to be coupled to each other. This is because the relative movement directions and speeds of the two objects are the same.

That is, even if it is not identified which model is a female model and which model is a male model and even if the male model is not moved in a designated direction in a state where the female model is fixed, it is possible to calculate the inserting force and the removing force. However, for ease of understanding, the following description will be made based on the case where the female model is fixed and the male model is moved toward the female model.

After the movement direction of the male model is set in order to couple the female model and the male model (operation S1200), the surfaces of the male and female models are separated (operation S1300). As described above, the materials and structures of two objects have a major influence on the inserting force and the removing force. Here, the materials of the two objects are values set as parameters in the process of calculating the inserting force and the removing force.

In addition, a contact surface is determined by the structures of the male and female models. Therefore, after 3D modeling data of two objects is loaded, the surfaces of the two objects are separated in order to calculate the contact surface (operation S1300). That is, external surfaces where a contact can occur are separated from the 3D modeling data (operation S1300).

After the external surfaces of the male and female models are separated, surface parameters are separated (operation S1400). The surface parameters include a normal vector, a surface type, a UV parameter, and an isosurface. The surface parameters will be described in detail later with reference to FIG. 4.

After the extraction of the surface parameters (operation S1400), the geometrical distance between the two models is calculated while the male model is moved toward the female model in the set direction (operation S1500). It should be noted that this process is performed through simulation on a numerical analysis program and that the geometrical distance between the two models is computed in the simulation, instead of being actually measured.

It is identified whether a minimum value of the geometrical distance between the two models calculated (operation S1600) while continuously moving the male model toward the female model (operation S1500) is zero (operation S1700). If the minimum value of the distance between the two models is larger than zero, the male model is moved continuously (operation S1500) because no contact has occurred yet. Conversely, if the minimum value of the distance between the two models is zero, it means that a contact has occurred. Therefore, the contact surface is calculated using the separated surface parameters (operation S1800).

Using the contact surface, it is possible to calculate the inserting force required in the process of coupling the male and female models. The process of calculating the inserting force according to the contact surface can be performed using a numerical analysis program. That is, the main objective of the inventive concept is to calculate the contact surface according to the relative positions of the male and female models.

If the calculated contact surface and the materials of the two objects are provided as parameters, the inserting force can be calculated automatically. Here, it should also be noted that the inserting force is a value calculated through simulation rather than a value actually measured using a prototype. After the contact surface at the current positions of the male and female models is calculated, it is checked whether the coupling of the male and female models has been completed (operation S1900).

That is, it is checked whether the male model can move further toward the female model (operation S1900). Whether the male model can move further toward the female model can be judged based on the contact surface between the male model and the female model. When a tube and a clip are completely engaged with each other, the contact surface has the largest possible value in the coupling process. Therefore, when the value of the contact surface between the male model and the female model is equal to a preset value, it can be determined that the coupling of the male and female models has been completed.

Conversely, if the value of the contact surface between the male model and the female model is smaller than the preset value, the coupling process is still in progress. That is, since the male model can be moved further, it is moved toward the female model (operation S1500), and the process of calculating the contact surface is repeated (operations S1600, S1700 and S1800).

Until now, the method of calculating the inserting force and the removing force based on 3D modeling has been described. By using the method proposed herein, it is possible to load 3D modeling data, simulate the process of coupling two objects by designating the coupling direction of the two objects, and automatically calculate the size of the contact surface according to the relative positions of the two objects.

Since the process of calculating the inserting force using the contact surface and the elastic modulus of two objects is well known in the art, a detailed description thereof will be omitted. By using the method proposed in FIG. 3, it is also possible to calculate the removing force, which is a necessary force in the process of separating two objects, through simulation.

As in the process of coupling two objects in FIG. 3, the direction of movement of any one object is designated in order to separate the two objects completely coupled to each other. More specifically, after two objects are finally coupled to each other in operation S1900 of FIG. 3, the process of separating the two objects is performed. The separation process begins with setting the separation direction to a direction opposite to the movement direction of the male model which was set in order to couple the two objects.

Then, the contact surface is calculated while continuously moving any one of the two objects until the geometrical distance between the two objects becomes larger than zero, that is, until the two objects are separated. The removing force can be calculated using the contact surface calculated in the separation process.

Figure 4:
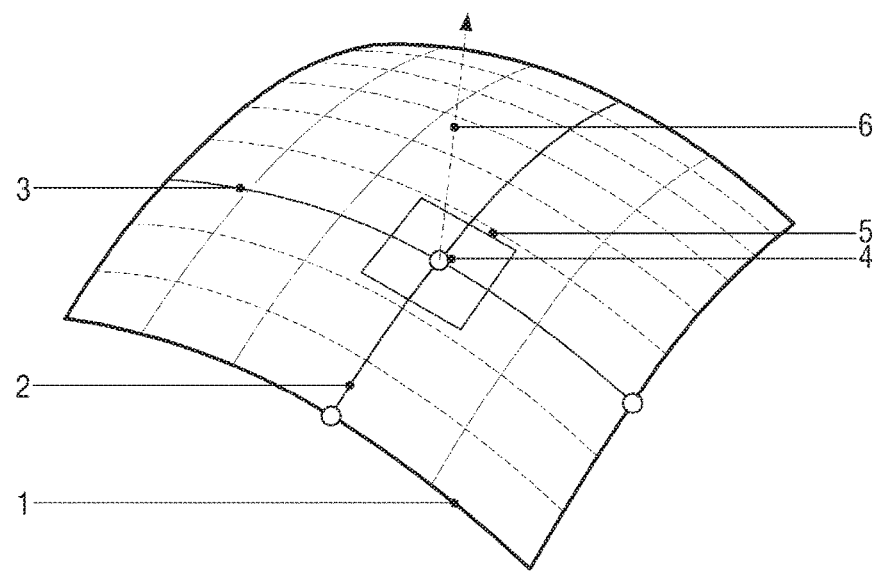
FIG. 4 illustrates parameters that can be used in an embodiment.

FIG. 4 illustrates parameters that can be used in an embodiment.

Referring to FIG. 4, reference numeral 1 indicates a surface. In the inventive concept, after 3D modeling is loaded (operation S1000), surfaces are separated (operation S1300). The surfaces may largely be planar surfaces or curved surfaces. Therefore, the coupling of male and female models may be the coupling of a plane and a plane, a plane and a curved surface, or a curved surface and a curved surface. In FIG. 4, a curved surface is illustrated as an example.

Two lines 2 and 3 orthogonal to each other at a specific knot can be drawn along the surface 1 with respect to the specific knot on the surface 1. Using these two lines 2 and 3, the flow of the surface 1 can be identified. These two lines 2 and 3 are called isoparametric curves (isocurves). In FIG. 4, reference numeral 2 indicates a U isocurve, and reference numeral 3 indicates a V isocurve.

A vector 6 orthogonal to the U isocurve 2 and the V isocurve 3 is called a normal vector. In addition, a vertical plane 5 refers to a small-sized plane centered at the specific knot. A vector normal to the vertical plane 5 is the normal vector 6.

Using the surface parameters illustrated in FIG. 4, the geometrical distance and the contact surface between the male model and the female model can be calculated. As mentioned above, the coupling of the male and female models may be the coupling of a plane and a plane, a plane and a curved surface, or a curved surface and a curved surface.

When a plane and a plane meet, if the normal vectors of the two planes are in opposite directions and the starting points of the two planes are the same, the two planes are in contact with each other. When a plane and a curved surface meet, the curved surface is divided into small planes, that is, vertical planes, and the normal vectors of the plane and the vertical planes are compared. When a curved surface and a curved surface meet, each of the two curved surfaces is divided into small planes, that is, vertical planes. Then, it is determined whether the vertical planes of the two curved surfaces are in contact with each other.

Based on the above assumptions, the process of actually loading 3D modeling, calculating the contact surface, and calculating the inserting force will now be described. The process of loading the 3D modeling is illustrated in FIG. 5, the process of calculating the inserting force according to the relative positions of male and female models is illustrated in FIG. 6, the process of calculating the contact surface according to the relative positions of the male and female models is illustrated her FIGS. 7A through 7D, and specific values calculated in the simulation process are illustrated in FIG. 8.

FIGS. 5 through 8 are diagrams for explaining a method of calculating an inserting force and a removing force based on 3D modeling according to an embodiment.

Figure 5:
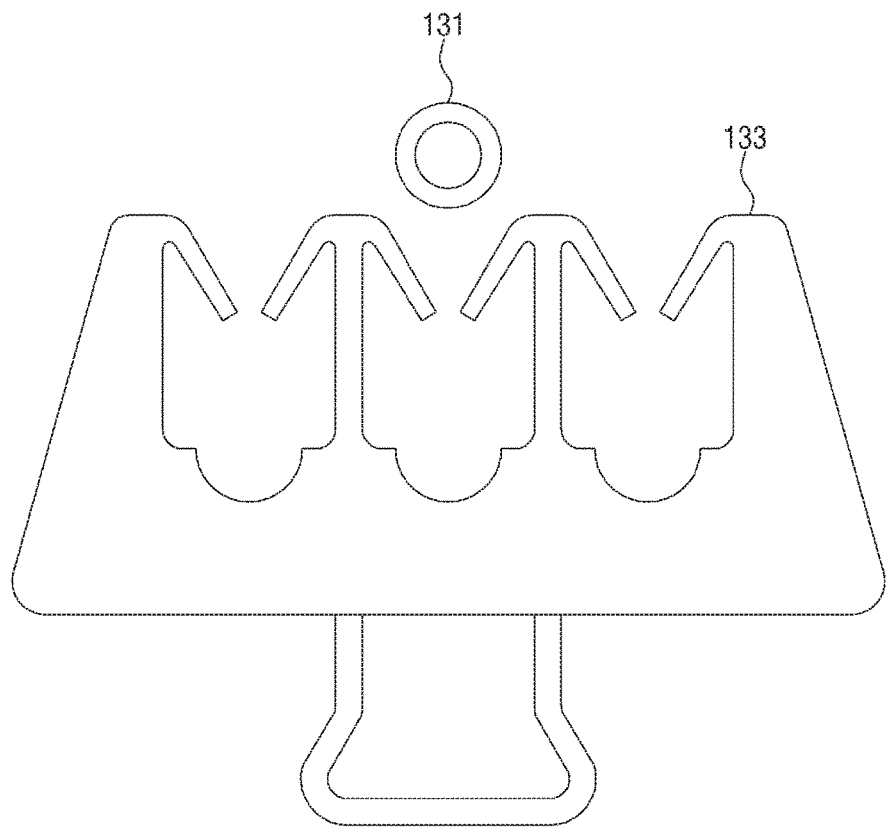
FIGS. 5 through 8 are diagrams for explaining a method of calculating an inserting force and a removing force based on 3D modeling according to an embodiment.
Figure 6:
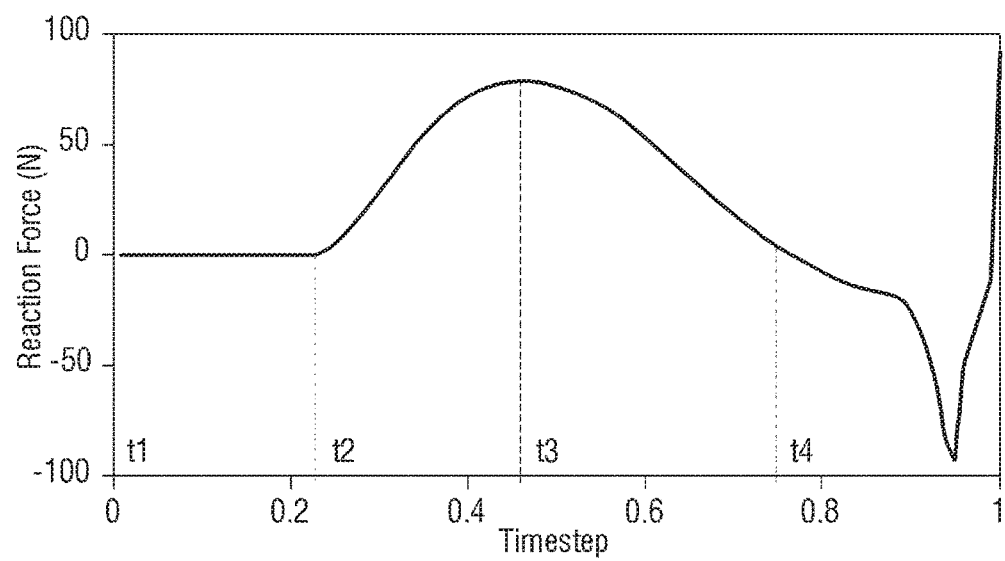

In FIG. 5, a lateral view of a tube 131 and a clip 133 is illustrated. When the tube 131 is pushed vertically downward toward the clip 133, it passes through an entrance portion of the clip 133 to be engaged with the clip 133. After 3D modeling data is loaded, which of the two objects will be moved in which direction is determined.

In the example of FIG. 5, the tube 131 corresponding to a male model may be moved for ease of understanding. Here, the direction of movement may be the vertically downward direction toward the clip 133. In addition, it is assumed that the tube 131 is moved at a constant speed set to a preset value.

Figure 7A:
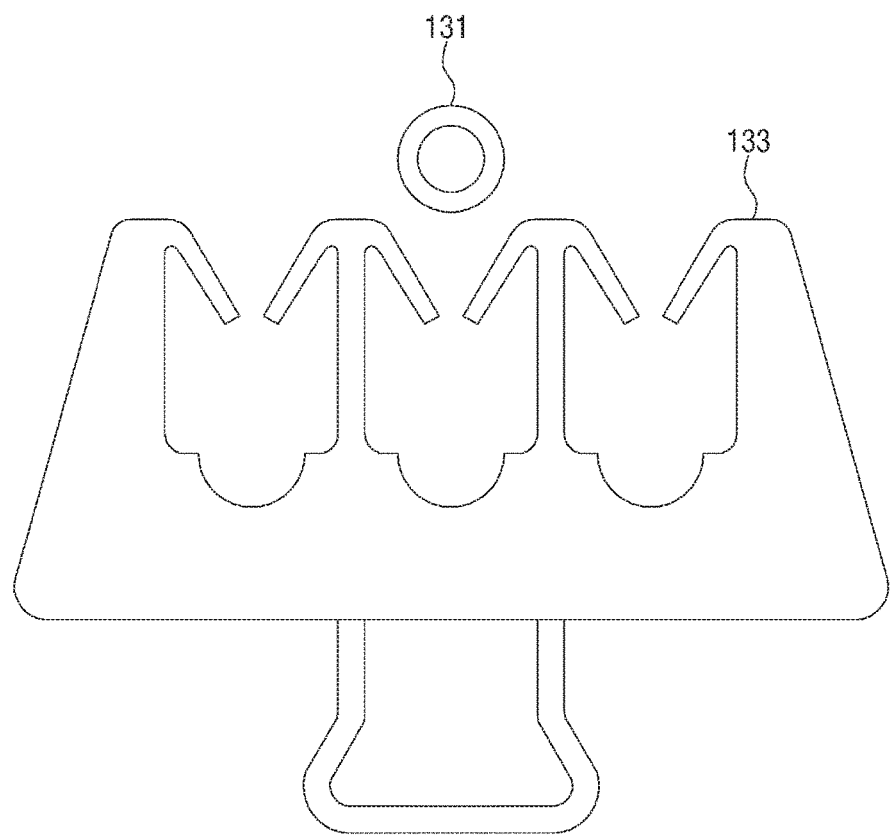
Figure 7B:
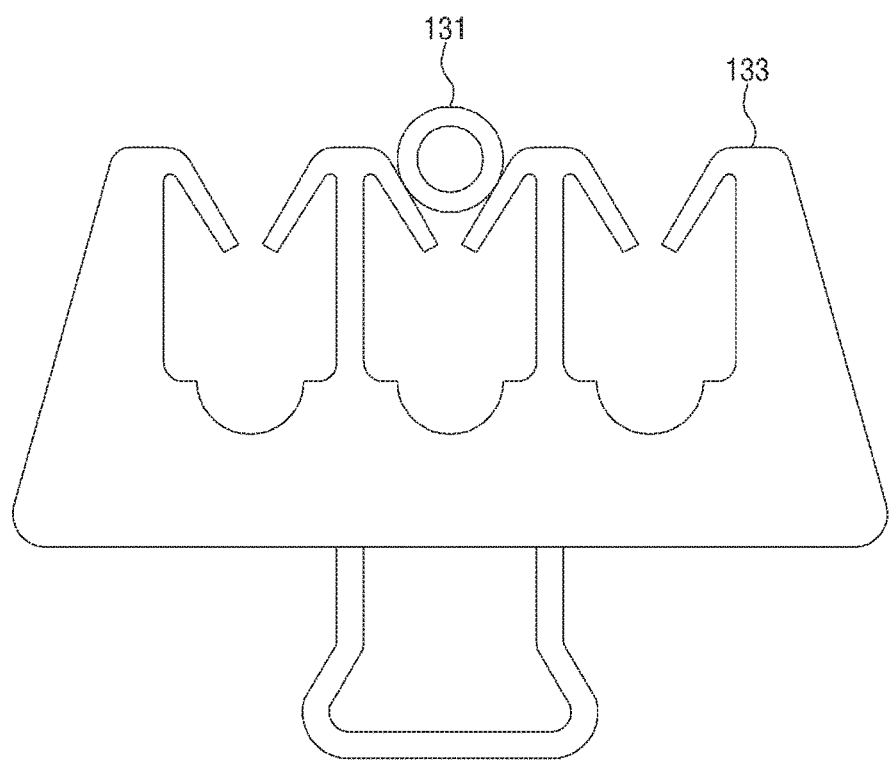
Figure 7C:
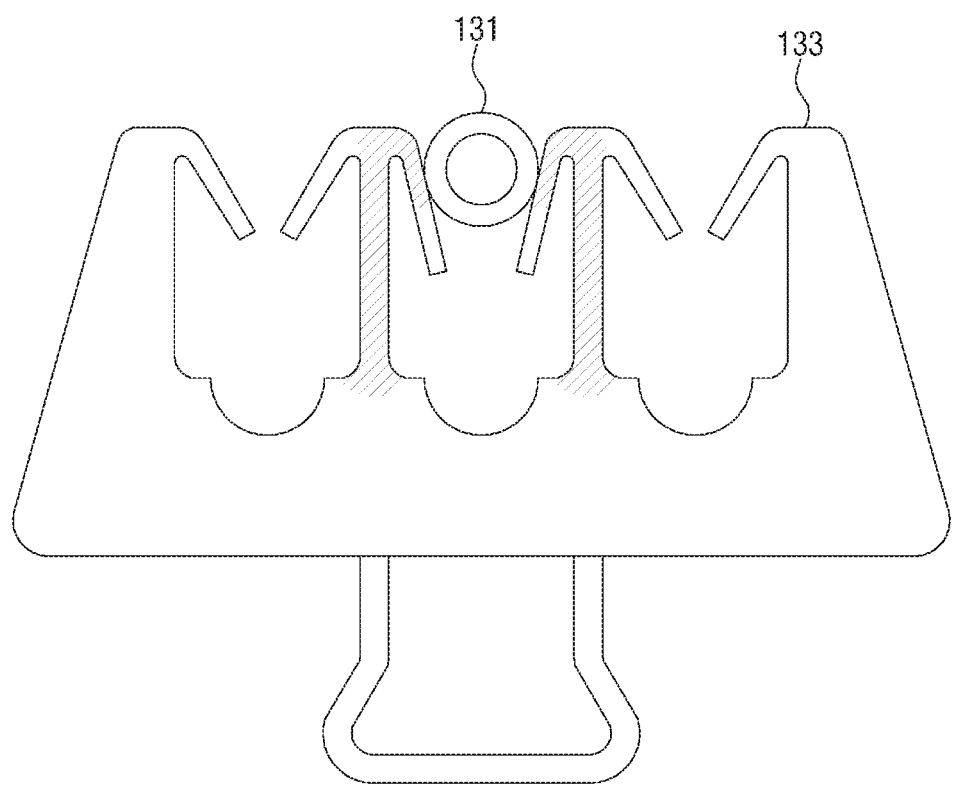
Figures 7D, 8:
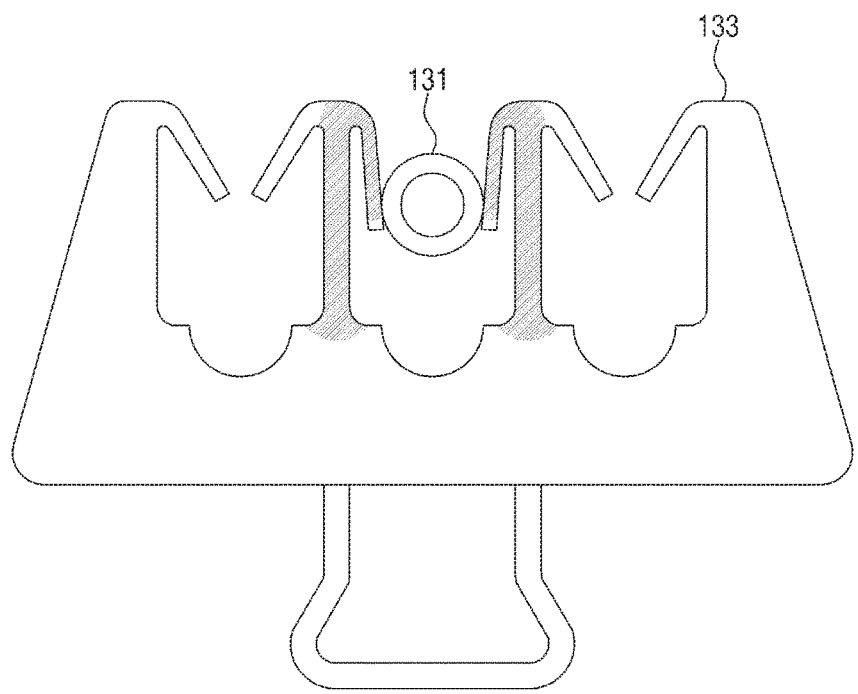

In FIGS. 7A through 7D, the process in which the tube 131 moves toward the clip 133 is illustrated. Referring to FIG. 7A, the tube 131 has not yet met the dip 133. That is, the relative positions of the tube 131 and the clip 133 at a time of 0 are illustrated.

Referring to FIG. 7B, the tube 131 moves toward the clip 133 and meets the entrance portion of the clip 133. At this time, the minimum geometrical distance between the tube 131 and the clip 133 becomes zero. After that, the minimum geometrical distance between the tube 131 and the clip 133 will be zero as the tube 131 continuously pushes into the entrance portion of the clip 133.

Since an inserting force is required from the stage of FIG. 7B in order to move the tube 131 into the clip 133, a contact surface between the tube 131 and the clip 133 is calculated at the stage of FIG. 7B. Next, if the tube 131 is moved further toward the clip 133, the result may be as illustrated in FIG. 7C.

Referring to FIG. 7C, the tube 131 has moved further downward than in FIG. 7B. Accordingly, the shape of the entrance portion of the clip 133 has been changed. Here, the inserting force is determined by the contact surface of the entrance portion and the elastic modulus of the entrance portion. In FIG. 7C, areas of the clip 133 where the inserting force is acting are shaded. Next, if the tube 131 is moved further toward the clip 133, the result may be as illustrated in FIG. 7D.

Referring to FIG. 7D, the tube 131 has moved further downward than in FIG. 7C. Accordingly, the shape of the entrance portion of the clip 133 has been changed more. Thus, more areas of the entrance portion of the clip 133 are shaded in FIG. 7D than in FIG. 7C.

While the inserting force is continuously acting as illustrated in FIG. 7D, the tube 131 is continuously moved downward. Then, when the tube 131 completely passes through the entrance portion of the clip 133, it is coupled to the clip 133 as illustrated in FIG. 1A. That is, when the tube 131 touches the inner bottom of the clip 133, the tube 131 and the clip 133 are coupled to each other.

Later, the tube 131 can be separated from the clip 133 by moving the tube 131 in an opposite direction, that is, in a vertically upward direction. In this case, the contact surface between the tube 131 and the clip 133 may also be found as in FIGS. 7A through 7D. Then, a removing force may be calculated using the found contact surface.

In FIG. 8, the result of simulating the process of coupling the tube 131 and the clip 133 in FIGS. 7A through 7D is illustrated. FIG. 7A corresponds to a time t1, FIG. 7B corresponds to a time t2, FIG. 7C corresponds to a time t3, and FIG. 7D corresponds to a time t4.

As mentioned above, it was assumed that, after the movement direction of the tube 131 was set, the tube 131 would be moved at a constant speed set to a preset value. Referring to FIG. 8, it can be seen that the tube 131 moved at a constant speed in the simulation of FIGS. 7A through 7D.

At the time t1, the tube 131 has not yet contacted the clip 133. Thus, the minimum geometrical distance between the tube 131 and the clip 133 is a unit length of 0.2, and the contact area at this time is zero. At the time t2, the tube 131 and the clip 133 start to meet. Since the process of coupling the tube 131 to the clip 133 continues from the time t2 to the times t3 and t4, the minimum geometrical distance between the tube 131 and the clip 133 is zero.

However, the contact surface continuously changes during the coupling process. In particular, the contact area, tends to increase gradually due the deformation of the entrance portion of the clip 133. Referring to FIG. 8, the contact area is a unit area of 5 at the time t2 when the contact starts, but, later, becomes a unit area of 20.

By simulating the process of coupling two objects using 3D modeling data, calculating a contact surface between the two objects in the simulation process, and calculating the inserting force using the contact surface between the two objects, it is possible to design a product in consideration of the inserting force and the removing force in the design process. The inserting force calculated through the process described above can be presented in a graph as illustrated in FIG. 6.

FIG. 6 is a graph illustrating the variation in the force (e.g., coupling force) required to move the tube 131 toward the clip 133 from the time t1 of 0 to a unit time of 1 in the process of coupling the tube 131 and the clip 133.

At the time t1 of 0, the tube 131 and the clip 133 have not yet met each other. Therefore, there is no additional force required to move the tube 131 toward the clip 133. From the time t2 when the tube 131 and the clip 133 meet each other for the first time, a force greater than the elastic force of the clip 133 due to the deformation of the entrance portion of the clip 133, that is, the force of restoring the clip 133 back to its original shape is required to move the tube 131.

Therefore, the inserting force is required from the time t2. As the tube 131 is pushed further into the clip 133 from the time t2 when the tube 131 and the clip 133 meet, the entrance portion of the clip 133 becomes more deformed. Thus, a greater inserting force is required.

Referring to FIG. 6, the time t3 is when the greatest inserting force is required, and the time t4 is when the inserting force is no longer required. It can be seen that the inserting force has a negative value from the time t4. This is because, after the tube 131 almost passes through the entrance portion of the clip 133, the entrance portion of the clip 133 applies a force to the tube 131 toward the inside of the clip 133 as it is restored to its original shape.

Finally, it can be seen that a very force is required to advance the tube 131 toward the clip 133. This is a situation where the tube 131 cannot move anymore even if pushed further because it has moved to the bottom of the clip 133 and has been completely coupled to the clip 133.

In the current state, the process of separating the tube 131 from the clip 133 can be simulated, and the removing force required at this time can be presented in a graph as in FIG. 6. Then, the graph of the inserting force and the graph of the removing force can be reflected in design by checking whether the graph of the inserting force and the graph of the removing force are respectively included in a target range of the inserting force and a target range of the removing force.

Figure 9:
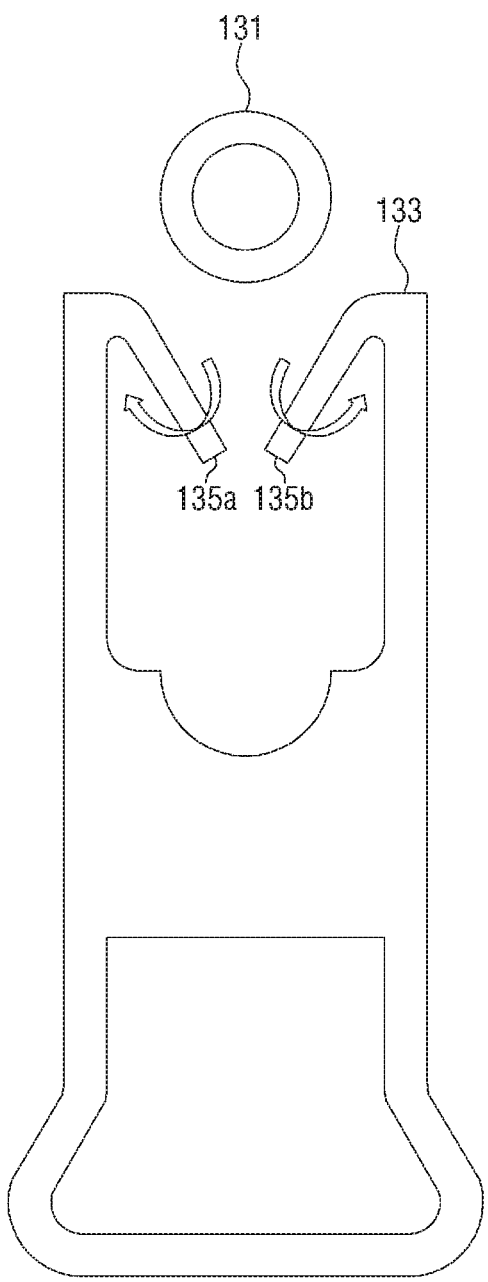
FIG. 9 is a diagram for explaining a method of reflecting the result of calculating an inserting force and a removing force according to an embodiment.

FIG. 9 is a diagram for explaining a method of reflecting the result of calculating an inserting force and a removing force according to an embodiment.

In FIG. 9, only a middle portion of the clip 133 of FIG. 5 is enlarged and illustrated. The inserting force required in the coupling process may vary according to the initial angle of left and right wings 135a and 135b of the entrance portion of the clip 133. This is because the degree to which the clip 133 is deformed as the tube 131 moves vertically downward varies according to the initial angle of the left and right wings 135a and 135b of the entrance portion of the clip 133.

Therefore, the result of calculating the inserting force and the removing force may be used to determine the proper initial angle of the left and right wings 135a and 135b of the entrance portion of the clip 133. For example, the range in which the initial angle of the left and right wings 135a and 135b of the entrance portion of the clip 133 in FIG. 9 can be changed may be determined. Then, a coupling simulation may he performed while varying the initial angle (designed in 3D modeling) of the left and right wings 135a and 135b of the entrance portion of the clip 133 from, for example, +10 degrees to −10 degrees.

In a state where the initial angle of the left and right wings 135a and 135b of the entrance portion of the clip 133 is set to 0, a positive value may he given to a case where the left and right wings 135a and 135b are rotated by a predetermined angle toward the tube 131, and a negative value may be given to a case where the left and right wings 135a and 135b are rotated by a predetermined in a direction opposite to the tube 131. If simulations are performed in this state, the results as shown in Table 1 can be obtained.

TABLE 1

| Initial Angle of Left and Right Wings 135a and 135b | Maximum Required Inserting Force |
|---|---|
| −10 degrees (rotated vertically downward) | 60 N |
| −5 degrees | 75 N |
| 0 degrees (in the case of FIG. 5) | 80 N (at t3 in FIG. 6) |
| +5 degrees | 85 N |
| +10 degrees (rotated vertically upward) | 88 N |

In a state where the initial angle designed in 3D modeling is set to 0 degrees, the maximum inserting force required in the process of coupling the tube 131 and the clip 133 can be obtained through simulation by varying the initial angle of the left and right wings 135a and 135b of the entrance portion of the clip 133 in the vertically downward direction and the vertically upward direction. The simulation results are summarized in Table 1.

Referring to Table 1, in the current design, a force of about 80N is required in the process of coupling the tube 131 and the clip 133. This is a force required at the time t3 as illustrated in FIG. 6. If a simulation is performed while varying the initial angle of the left and right wings 135a and 135b of the entrance portion of the clip 131 from 0 degrees to 10 degrees in the vertically upward direction, the maximum required inserting force is 85N at +5 degrees and is 88N at +10 degrees.

Conversely, if a simulation is performed while varying the initial angle of the left and right wings 135a and 135b of the entrance portion of the clip 131 from 0 degrees to 10 degrees in the vertically downward direction, the maximum ed inserting force is 75N at −5 degrees and is 60N at −10 degrees As is apparent from Table 1 the maximum inserting force required in coupling process varies according to the initial angle of the left and right wings 135a and 135b of the clip 133. Therefore, the angle of the left and right wings 135a and 135b of the clip 133 can be modified using the target magnitude of the inserting force.

That is, by using the inserting forces obtained from the simulation results as feedback, it is possible to change the design of a portion requiring tuning in the design process. In addition, the force required to separate two objects from each other can be calculated through simulation, and the design can be modified using the calculated force.

That is, it is not only possible to find a contact surface and calculate the inserting force and the removing force through simulation, but also possible to reflect the simulation result in design, thereby reducing the cost and time required to design a product. For example, if the target range of the inserting force and the target range of the removing force are determined and if the range of a portion requiring tuning is determined, an appropriate angle can be automatically recommended through simulation.

In the example of Table 1, if a required force is to be designed to be a maximum of about 70N, an angle corresponding to a maximum of 70N may be automatically recommended through simulation among values between −5 degrees and −10 degrees. In this way, a contact surface required in the coupling process may be automatically found through simulation, an inserting force at that time may be calculated, and the calculated inserting force may be taken into consideration in the design process.

Figure 10:
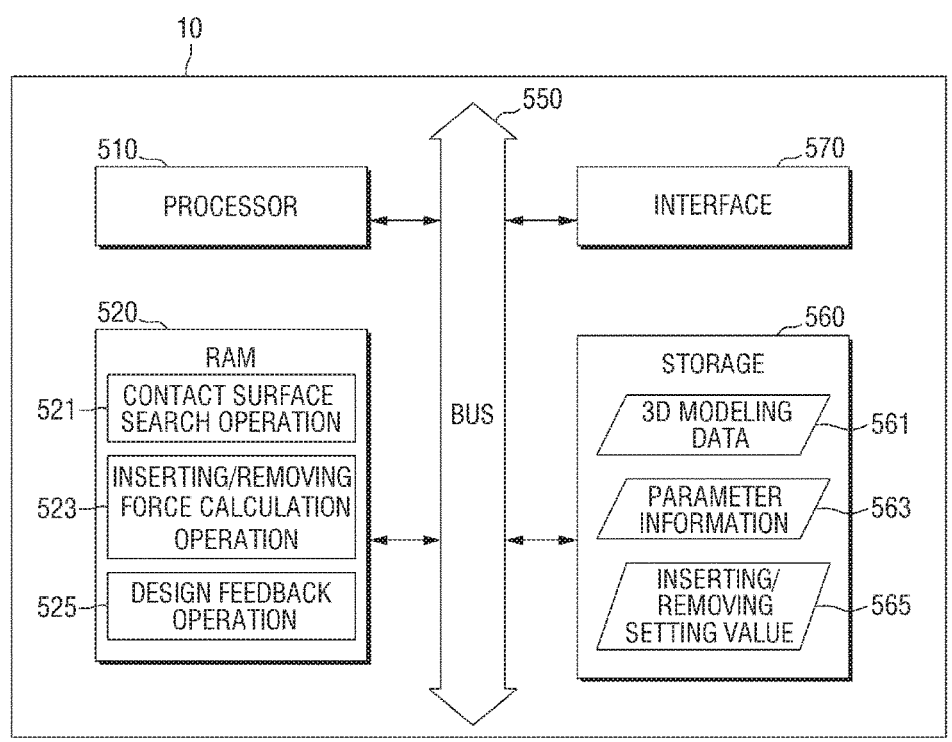
FIG. 10 illustrates the hardware configuration of an apparatus for calculating inserting force and a removing force based on 3D modeling according to an embodiment.

FIG. 10 illustrates the hardware configuration of an apparatus 10 for calculating an inserting force and a removing force based on 3D modeling according to an embodiment.

Referring to FIG. 10, the apparatus 10 for calculating an inserting force and a removing force based on 3D modeling may include one or more processors 510, a memory 520, a storage 560, and an interface 570. The processors 510, the memory 520, the storage 560, and the interface 570 transmit and receive data through a system bus 550.

The processors 510 execute a computer program loaded into the memory 520, and the memory 520 loads the computer program from the storage 560. The computer program may include a contact surface search operation 521, an inserting/removing force calculation operation 523, and a design feedback operation 525.

The contact surface search operation 521 loads 3D modeling 561 stored in the storage 560. Then, to simulate the coupling of two models included in the 3D modeling, the position of a first model is fixed, and the direction of movement of a second model is designated.

The contact surface search operation 521 calculates the minimum geometrical distance between the first model and the second model while moving the second model in the designated direction. The coupling of the first and second models starts from the moment when the minimum geometrical distance between the first model and the second model is zero. Then, when the coupling of the two models starts, a contact surface is searched for.

To this end, the contact surface search operation 521 may separate the surfaces of the first model and the second model and store parameter information of the separated surfaces as parameter information 563 in the storage 560 via the system bus 550. Then, the contact surface search operation 521 searches for the contact surface between the first model and the second model by using the surface parameters. This process is continued until the second model is completely coupled to the first model and thus cannot move anymore in the designated movement direction.

The inserting/removing force calculation operation 523 calculates an inserting force required to couple the first model and the second model by using the contact surface found by the contact surface search operation 521 and parameter information related to the materials of the two models. Then, the inserting/removing force calculation operation 523 may provide the calculated magnitude of the inserting force required from the start of the coupling to the completion of the coupling to a terminal of a user of the apparatus 10 through the interface 570.

The above-described process of finding the contact surface and calculating the inserting force in the process of coupling two models can be similarly applied to the process of finding the contact surface and calculating the removing force in the process of separating the two models. The inserting force and the removing force thus obtained can be reflected in the design process as feedback.

To this end, the design feedback operation 525 receives a portion that needs to be tuned in the 3D modeling 561 and the range of the portion through the interface 570. In addition, the design feedback operation 525 receives a target inserting force and a target removing force through the interface 570 and stores the target inserting force and the target removing force in the storage 560 as an inserting/removing force setting value 565.

Then, the design feedback operation 525 repeatedly performs a simulation while changing the portion (input by the user) requiring tuning within the range of the portion. The maximum or minimum value of each of the inserting force and g force calculated in the simulation process, compared with the inserting/removing force setting value 565 input by the user. When the maximum or minimum value of each of the inserting force and the removing force satisfies the inserting/removing force setting value 565 input by the user, it may be provided to the user as design information.

Each component described above with reference to FIG. 10 may be implemented as a software component or a hardware component such as a field programmable gate array (FPGA) or application-specific integrated circuit (ASIC). However, the components are not limited to the software or hardware components and may be configured to reside on the addressable storage medium or configured to execute one or more processors. The functionality provided for in the components may be combined into fewer components or further separated into additional components.

Embodiments provide at least one of the following advantages.

It is possible to calculate the inserting and removing forces of a pair of male and female objects by using 3D modeling created in the design process. That is, the inserting force and the removing force can be calculated without producing a prototype. In addition, a simulation can be performed by designating the target range of the inserting force and the target range of the removing force, and a portion that needs to be modified in the design and the degree of modification can be automatically calculated. However, the effects of the embodiments are not restricted to the one set forth herein. The above and other effects of the embodiments will become more apparent to one of daily skill in the art to which the embodiments pertain by referencing the claims.

While the present invention has been particularly illustrated and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

It is claimed:

1. A method of calculating an inserting force using 3D modeling, the method being performed by a numerical analysis apparatus and comprising:
    receiving 3D modeling of a first model and a second model;
    receiving a first movement direction of the first model to couple the first model to the second model;
    searching for a contact surface between the first model and the second model while simulating the movement of the first model along the first movement direction;
    calculating an inserting force required in the process of coupling the first model and the second model by using the contact surface;
    wherein the searching for of the contact surface between the first model and the second model while simulating the movement of the first model along the first movement direction comprises:
        calculating a minimum value of a geometrical distance between the first model and the second model;
        determining that the first model and the second contact are in contact with each other when the minimum value of the geometrical distance is zero; and
        searching for the contact surface by using surface parameters of the first model and surface parameters of the second model when it is determined that the first model and the second model are in contact with each other;
    determining that the coupling of the first model and the second model has been completed when a size of the contact surface between the first model and the second model is equal to a preset value and stopping the simulation;
    modifying the 3D modeling of the first model or the 3D modeling of the second model by using the inserting force as feedback to design a product more efficiently; and
    creating the product using one of the modified 3D modeling of the first model or the modified 3D modeling of the second model.

2. The method of claim 1, comprising automatically calculating the first movement direction by analyzing the 3D modeling of the first model and the second model instead of receiving the first movement direction of the first model to couple the first model to the second model.

3. The method of claim 1, wherein the surface parameters of the first model and the surface parameters of the second model comprise a normal vector, a surface type, a UV parameter, and an isosurface.

4. The method of claim 1, further comprising modifying the 3D modeling of the first model or the 3D modeling of the second model by using the inserting force as feedback.

5. A non-transitory computer readable storage medium storing a program of instructions to execute the method of claim 1 by using a computer.

6. A numerical analysis apparatus comprising:
    one or more processors;
        a memory which loads a computer program to be executed by the processors; and
        a storage which stores 3D modeling of a first model and a second model,
        wherein the computer program comprises:
        a contact surface search operation which receives a first movement direction of the first model to couple the first model to the second model, searches for a coupling contact surface between the first model and the second model while simulating the movement of the first model along the first movement direction, and searches for a separation contact surface between the first model and the second model while simulating the movement of the first model along the second movement direction;
        an inserting/removing force calculation operation which calculates an inserting force required in the process of coupling the first model and the second model by using the coupling contact surface and calculates a removing force required in the process of separating the first model and the second model by using the separation contact surface;
    a modifying operation which modifies the 3D modeling of the first model or the 3D modeling of the second model by using the inserting force and the removing force as feedback to design a product more efficiently; and
    a creation operation which creates the product using one of the modified 3D modeling of the first model or the modified 3D modeling of the second model.

* * * * *